(12) United States Patent
Schirmer

(10) Patent No.: US 6,369,837 B1
(45) Date of Patent: Apr. 9, 2002

(54) GUI SELECTOR CONTROL

(75) Inventor: Andrew L. Schirmer, Andover, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/118,024

(22) Filed: Jul. 17, 1998

(51) Int. Cl.$^7$ .................................................. G06F 3/00
(52) U.S. Cl. ...................................... 345/764; 345/784
(58) Field of Search ............................... 345/419, 115, 345/133, 174, 145, 156, 152, 334, 349, 249, 355, 357, 339, 764, 765, 784, 839, 848, 854

(56) References Cited

U.S. PATENT DOCUMENTS 5,446,833 A * 8/1995 Miller et al. ................ 345/125
5,734,805 A * 3/1998 Isensee et al. .............. 345/133
5,867,158 A * 2/1999 Murasaki et al. ........... 345/340
5,945,998 A * 8/1999 Eick ........................... 345/431

* cited by examiner

Primary Examiner—Cao H. Nguyen
(74) Attorney, Agent, or Firm—Kudirka & Jobse, LLP

(57) ABSTRACT

An improved graphical control for desktop computing systems utilizes one or more control devices with adjustable opacity and size to allow an operator to perform desired operations or edit object properties while also minimizing screen clutter. According to the illustrative embodiment, the graphical control is implemented as one or more "rollerballs" having a peripheral border defining a central interior region. The speed with which the selected value scrolls is dependent upon the active region of the rollerball currently selected. Values associated with the data entity may be scrolled at a rate, which increases nonlinearly as the selected portion of the active region progresses from the central interior region toward the peripheral border. A group of rollerballs, each representing a different entity may be moved collectively about the desktop and ordered in accordance with a predefined criteria, such as frequency of user selection.

33 Claims, 11 Drawing Sheets

GUI SELECTOR CONTROL

FIELD OF THE INVENTION

The invention relates generally to computer systems and more particularly to the computer's graphical user interface (GUI) arid improved user interaction with the computer system.

BACKGROUND OF THE INVENTION

Computers, such as personal computers (PCs), e.g. systems utilizing DOS, Windows, or Windows NT by IBM or the Macintosh by Apple, and workstations, have become commonplace tools for a variety of users. As a group, these computers can be referred to as "desktop" computers. Desktop computers are now used routinely in a wide variety of environments: schools, laboratories, businesses, government agencies, homes, etc. The ever-increasing reliance on computers has lead to increased standardization of the GUI and means of interacting with the GUI. For example, windows, toolbars, menus, and icons are implemented on a wide variety of platforms and have come to be expected components of a desktop computer's GUI. As a result, in some instances, for often used devices, users have become so proficient that they can often utilize common visual devices efficiently based primarily on memory of location of icons on the screen or on the location of menu items within a menu.

While computer users have become more skilled, so too have computers and computer applications become more advanced. Computers, and operators, have reached the point where a user may have multiple windows open with applications running and processing commands in any number of these open windows, called multi-tasking. Also, applications have become increasingly feature rich, and often provide an increasing amount of visual devices as the application versions progress. Together, these forces have led to increased contention for space on the computer screen or GUI, creating "screen-clutter" and an often cumbersome GUI work environment.

Another factor at work in desktop computer systems is the rapid and wide-scale migration to object oriented design (OOD) applications, rather than structured programming applications. In OOD, objects can be used to represent most any entity, with various aspects of the entity being represented as modifiable properties and entity behaviors being represented as methods. This change manifests itself not only in the actual creation of programs, but also in the way in which users control, create, modify, and otherwise interact with application entities or objects visually within the GUI. Modifying a property of an object often entails the changing of a value associated with the object's properties. For example, if a user had a calendar represented as an object, the calendar object could have a property to represent the days of the month and the values associated with the property for days could be the numerical values of 1–28 for February. Therefore, changing the property value could be accomplished in a variety of ways, such as selecting a number from a menu list, scrolling through a number list, or by selecting the number from a visual representation of the calendar object. With increased focus on object oriented applications and tools, it is increasingly important to allow users to efficiently choose properties and modify property values within the increasingly cluttered GUI.

A typical desktop computer is depicted in FIG. 1. Devices which allow a user to interact with the computer's GUI are called input devices and include a keyboard, mouse, trackball, light pen, or other such devices. As mentioned, the typical GUI for a desktop computer utilizes a window-based approach. Such a system usually includes a plethora of menus, toolbars, icons, palettes, and other visual devices used to control the operation of the computer and properties of various entities or objects. Wherein, "pull-down menus" are often used as a means for performing operations or changing object properties relative to an "active" window, which displays an interface to a given application, e.g. a web browser, or an application file, e.g. word processing document or spreadsheet. The active window is the window in direct control by the user at a particular instance in time, although other windows may be processing information under multi-tasking. For example, if a user had a word processing document open, a set of menus would be available to the user, indicated by menu titles running, usually, across the top of the window. Placing the computer's cursor over a menu title and selecting the menu, usually done by depressing a mouse button, reveals a vertical list, or linear menu, of operations, e.g. for opening, closing, and saving the document, or for editing properties, e.g. bold, italics, or underline for text formatting, available to the user. Many current'systems also allow a nesting of menus, such that selecting an item from the menu list reveals another linear menu of available operations. Ultimately, a user can select an operation to be performed from one of these nested linear menus. The problem with these menus is that they inherently cause significant obstruction of the underlying window when used, as shown in FIG. 2.

While vertical linear pull-down menus tied to a window frame are by far the most common type of menu employed, other types of menus have also been used. For example, tear-off menus, typically vertical linear menus, differ from pull-down menus in that they are not rigidly tied to the window frame itself. Tear-off menus may first appear tied to the window frame, but can be moved or "dragged" by the user anywhere on the display. Another type of linear menu, the pop-up menu, presents a user with a menu which is not tied to the window frame itself, but usually appears in the position where the cursor was when the menu was requested by some operator action or in a predefined location, such as the center of the window. Like the tear-off menu, the pop-up menu can be repositioned on the screen.

Other types of menus depart from the linear approach in favor of a circular approach. The pie menu is a circular menu, which is divided by a series of radii forming pie segments. It is customary for each pie segment to contain one menu choice. Some pie menus show only a subset of available menu choices and allow a user to scroll through the choices, referred to as scrolling pie menus. A fan menu, which is not common, is half of a pie menu. Circular menus can also be in the form of "rings", where a ring is related to a particular menu choice. Usually these circular types of menus are not tied to a window frame and can be moved by the operator about the display. The primary challenge with circular menus is that the menu item names can get cluttered or even overlap, cause the circle to be large to accommodate menu item names, or menu item names can be oriented radially making some of the item names difficult to read. The benefit of pie menus is that they are considered to offer better user accuracy and speed than their linear menu counterparts.

Some menus are hybrids of the linear and circular types. For example, U.S. Pat. No. 5,596,699 ('699) to Driskell discloses two linear menus side-by-side with a circular menu region incorporated in the center of the combined linear menus. The circular region, however, does not represent a plurality of menu items, but is either non-functional or has only one function. This type of menu attempts to offer some of the increased speed and accuracy of pie menus without the problems related to pie menu item names, because the names are all horizontal within the linear menus. However, as disclosed, this combination is relatively wide and, therefore, is more likely to obscure the underlying document or window.

Yet another type of menu allows an operator to not only select an operation but also supply the value from a range of values for a parameter associated with that operation. These are called "valuator menus". U.S. Pat. No. 4,896,291 to Gest, et al. discloses such a menu, where the menus are either vertical or horizontal linear menus and the parameter value is determined by the horizontal movement of the cursor within the horizontal menu item field. The parameter value is displayed for the user as the cursor moves. For example, if, from a menu of fonts, the user put the cursor over the "Courier" menu item, then moving the cursor left to right would increase the font size within a predetermined range of values and vice versa for the selected text.

Typically, the menus discussed above are opaque. As such, they tend to obstruct the underlying window or document, again see FIG. 2. This creates screen clutter and reduces user efficiency, largely due to the uncertainty of modifying an entity, which you can not fully see because it is obstructed by the menu. Erroneous modifications further decrease efficiency by creating rework and causing reselection of the menu to fix the error. In fact, this problem gave rise to the tear-off and pop-up menus, which could be moved so as to minimize obstruction or at least give the user the choice in where the unavoidable obstruction would occur. However, these movable menus usually can not be moved such that the document is fully visible to the user, unless the document window itself is shrunk down to reduce the overlap with the menu. Minimizing the size of the document is not desirable as it reveals less of the information in the window. Many systems also allow menus with multiple levels, i.e. nested, to be cascaded, thereby minimizing the obstruction of the underlying window. Cascading allows the menus to partially overlap each other to cut down on the overlap with the underlying window. However, the obstruction persists and is greater than if just one menu were selected.

Another attempt to resolve the obstruction problem is partially transparent linear menus, disclosed in U.S. Pat. No. 5,283,560 ('560) to Bartlett. In the '560 patent, partially transparent linear pull-down and tear-off menus are disclosed. The partial transparency is achieved by reducing the number of menu pixels illuminated on the screen where the menu overlaps with the underlying window. While this compromises the clarity of the window document itself in the area of the overlap, as well as the clarity of the menu, it is, nonetheless, an improvement over opaque menus. The size of the menu is completely dependent on the number of items in the menu and is not adjustable, so that the area of overlap between the menu and the document can not be minimized to improve the clarity of the document in the affected area.

In an effort to increase the user's speed of operation and reduce screen clutter, other implementations of controls and menus have been experimented with, but are not in widespread use. For example, a menu, such as a pie menu, can be "self-revealing". A self-revealing menu is one which, when selected, does not show itself immediately. The concept is that once a user gets used to seeing any given icon or menu appear in the same place repeatedly, the user may become familiar enough with its position on the screen so that the user need not actually see the menu or icon to make correct selections from or of it. Selecting from a menu in this manner is referred to as "marking ahead". This combination of marking ahead and self-revealing menus saves a proficient user's time and relieves the computer's processor from having to "paint" the menu on the screen, which allows the computer to operate a bit faster. However, this approach can provide benefit for only a small subset of cases, because it is not likely that users will remember more than a few of the menu items and their respective screen positions, leaving the user to wait for the computer to reveal, or paint, the actual menu in most instances. Waiting for the menu to get painted, with the inherent delay of this approach, actually decreases the user's overall efficiency.

A need exists for a GUI with minimal obstruction of an underlying window from operator controllable devices. A need exists to minimize the obstruction that menus or other operator controllable devices provide by controlling their transparency and size. A need also exists for operator controllable menus, which provide increased speed and accuracy over standard linear menus and are responsive to the operator's desire to control the speed of operation or property value selection. Furthermore, a need exists for menus, which allow increased accuracy and speed by a user who is interacting with or controlling not only a property or operation, but simultaneously the value of the property or operation.

SUMMARY OF THE INVENTION

The present invention provides a method and apparatus for an improved graphical user interface for a desktop computer. Screen clutter is reduced and operator efficiency increased through the implementation of improved visual control device on a computer display. According to the illustrative embodiment, the graphical control device is implemented as one or more "rollerballs" having a border defining an active central region. The speed with which the selected value scrolls is dependent upon the active region of the rollerball currently selected. The rollerball device has an active region characterized by a peripheral border surrounding a central interior region. Values associated with the data entity may be scrolled through at a rate, which increases nonlinearly as the selected portion of the active region progresses from the central interior region toward the peripheral border.

A group of "rollerballs" may be used to represent a set of operations, or a set of menus. A group of rollerballs, which can also be used to represent a given object's properties, is arranged in a spiral configuration to form a compact and easy to navigate set of choices for the user. When the rollerballs are not being used, they may be semi-transparent, or low opacity, which minimizes the obstruction to the underlying window. When the rollerballs are activated, the rollerball which is being hovered over, or preselected, increases in size. The preselected rollerball also becomes completely opaque and the rollerballs adjacent to increase in opacity.

According to one aspect of the invention, a computer program product for use with a computer system having a display apparatus, a graphic user interface and an input device comprises a computer usable medium having computer readable program code thereon for creating a control device to enable selection and control of a data entity, the control device having at least one operational state and a plurality of visual characteristics. The computer readable program code comprises program code for maintaining the operational state of the device, program code for generating a graphical display of the device, program code for defining an active region of the graphic display, program code for displaying a value associated with a data entity to which the device relates, and program code for selectively scrolling through displayed values of the data entity at a rate which varies in response to the portion of the active region selected.

According to one embodiment, the program code for selectively scrolling display values of the associated data entity at a rate which increases nonlinearly as a selected portion of the active region progresses from the central interior region towards the peripheral border. According to another embodiment, the program code for generating the graphic display comprises program code for selectively changing the opacity of the control device in relation to changes in the operational state of the control device. In yet another embodiment, the program code for generating a graphic display comprises program code for modifying the size of the control device in response to changes in the operational state of the control device. In yet another embodiment, program code is provided for creating a group of control devices selected of the control devices each representing a different data entity and program code for arranging the group of control devices in accordance with a predetermined criteria, such as the frequency of user-selection.

According to a second aspect of the invention, in a computer system having a display device with a graphic user interface and an input device, a graphic control device for selecting and controlling user selectable parameters comprises program logic for displaying the control device, program logic for displaying a value related to the parameter associated with the control device, program logic for defining an active region of the control device and enabling selection of the active region, each portion of the active region having associated therewith a scrolling rate and program logic for modifying the visual characteristics of the control device in response to changes in the operational state of the control device.

According to a third aspect of the invention, in a computer system having a display device with a graphic user interface and an input device, a method for selecting and controlling user selectable parameters with a graphic control device comprises generating and displaying the control device, displaying a value related to the parameter associated with the control device, defining an active region of the control device and enabling selection of the active region, each portion of the active region having associated therewith a scrolling rate and modifying the visual characteristics of the control device in response to changes in the operational state of the control device.

BRIEF DESCRIPTION OF THE DRAWINGS

The above and further advantages of the invention may be better understood by referring to the following description in conjunction with the accompanying figures, described below.

DESCRIPTION OF THE ILLUSTRATIVE EMBODIMENT

The illustrative embodiment essentially comprises a typical desktop computer running standard software applications and is implemented as object oriented design (OOD) software, although other software programming languages could also suffice. The illustrative embodiment constitutes both apparatus and methods as described below.

Computer Architecture

Figure 1:
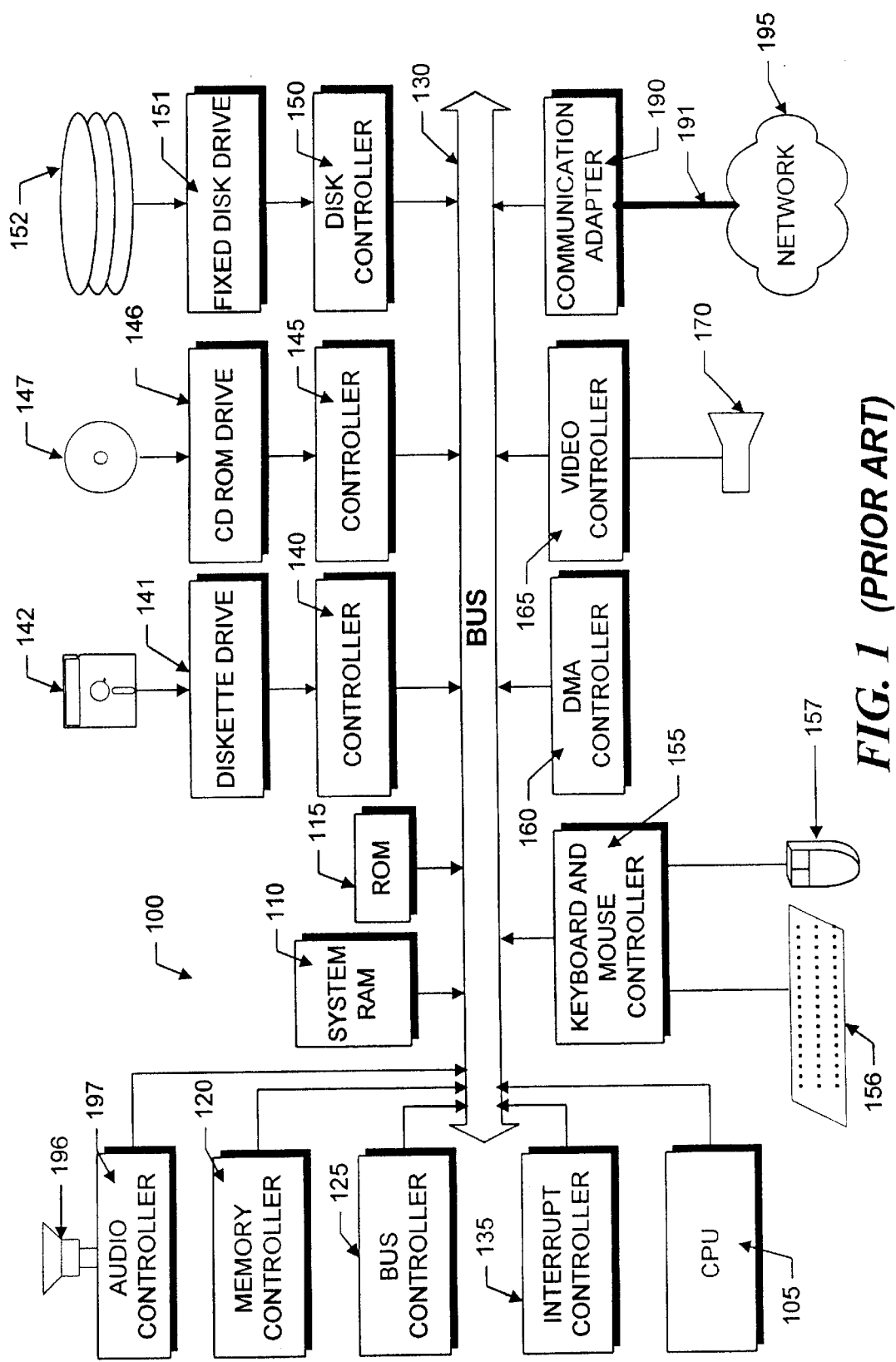
FIG. 1 is a conceptional block diagram of a prior art desktop computer.
Figure 2:
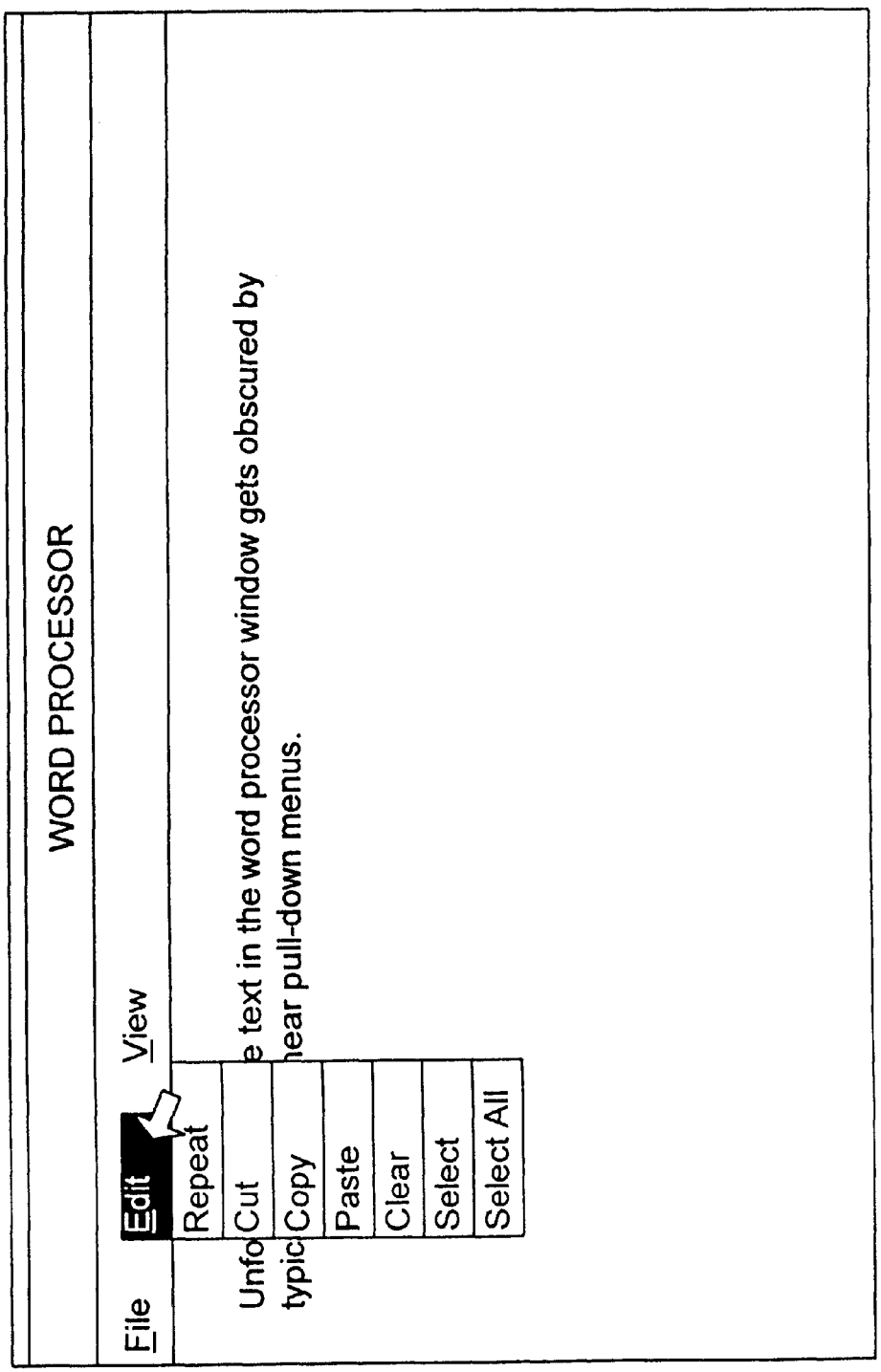
FIG. 2 is a typical prior art pull-down menu and window arrangement.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RMA 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141, which is, in turn, connected to bus 30 by a controller 140. Similarly, CD ROM 147 is insertable into CD ROM drive 146, which is, in turn, connected to bus 130 by controller 145. Hard disk 152 is part of a fixed disk drive 151, which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165, which controls video display 170. Computer system 100 also includes a communications adapter 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among other things.

Object Oriented Design (OOD)

The preferred embodiment is implemented in the Java programming language. However, other OOD or non-OOD languages may also be used to achieve the inventive apparatus and methods described herein. A brief overview of Java, and to some degree OOD languages generally, is provided below for completeness.

Object Oriented Programming (OOP), or OOD programming, techniques involve the definition, creation, use and destruction of "objects". These objects are software entities comprising data elements, or attributes, and methods, or functions, which manipulate the data elements. The attributes and related methods are treated by the software as an entity and can be created, used and destroyed as if they were a single item. Together, the attributes and methods enable objects to model virtually any real-world entity in terms of the entity's characteristics, represented by the data elements, and the entity's behavior, represented by data manipulation functions or methods. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods, which manipulate the object's data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor, which uses the corresponding class definition and additional information, such as arguments provided during object creation, to construct the object. Likewise, objects are destroyed by a special function called a destructor. Objects may be used by using their data and invoking their methods. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal methods. More particularly, during program design, a program developer can define objects in which all or some of the attributes and all or some of the related methods are considered "private" or for use only by the object itself. Other data or methods can be declared "public" or available for use by other programs. Access to the private variables by other programs can be controlled by defining public methods for an object, which access the object's private data. The public methods form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions, which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes, and the objects, which are later created from them, as related. Specifically, classes may be designated as subclasses of other base classes. A subclass "inherits" and has access to all of the public functions of its base classes just as if these functions appeared in the subclass. Alternatively, a subclass can override some or all of its inherited methods or may modify some or all of its inherited methods merely by defining a new method with the same form. Overriding or modification does not alter the method in the base class, but merely modifies the use of the method in the subclass. The creation of a new subclass which has some of the functionality, with selective modification, of another class allows software developers to easily customize existing code to meet their particular needs.

A common feature to OOP languages is that objects or components can be created using a "component model". In the case of Java, components are essentially Java objects that conform to a Java object model, such as ActiveX by Microsoft or OpenDoc by Apple. Generally speaking, an object model is a unifying set of rules that describe object structure, object life cycle, and inter-object communication. Object structure relates to the physical layout of objects in memory, while object life cycle refers to how applications create and destroy objects. Inter-object communication refers to protocols by which objects communicate with one another. Object models are useful in contexts where all objects in a given system need to conform to a given protocol governing these parameters. Most object-oriented and object-based languages, including the Java programming language, do not specify true object models, but merely specify syntax and semantics of a basic object implementation without specifying the rules that unify object systems.

Once an object has been created, its properties and methods are then of primary interest to a user of that object.

Modifying an object will typically involve the editing of that object's properties or implementing the methods in varying ways.

Rollerball Control Apparatus

The illustrative embodiment describes the use of a GUI selector control device for visually representing an entity, such as an object property, operation, or menu, on a computer display. In the illustrative embodiment the selector control device takes the form of a "rollerball", as described herein. If representing an object, the rollerball provides a program logic for visually selecting a value for a property of the object. If the rollerball represents a menu, then the rollerball provides a program logic for selecting an item from that menu. Otherwise, a rollerball could represent an operation, wherein selection of the rollerball alone initiates an operation and a value, per se, need not be associated with the operation. Shapes other than rollerballs may also be used to represent GUI selector control devices and may provide substantially the same benefits. Also, the scope of the many possible applications for the selector control devices should not be limited to that which is disclosed herein, as many other applications would be obvious to one of ordinary skill in the computer related arts.

Given that there are often multiple properties associated with an object, multiple operations associated with an application, and multiple menus associated with an application, multiple selector controls will be required in a majority of instances. Hence, a selector control group may be used to represent these multiple items of interest. In the illustrative embodiment, a plurality of rollerballs are simultaneously displayed as a group where multiple devices are appropriate. The selector controls, i.e. rollerballs, are arranged in an ordered spiral configuration which provides a smooth flow from rollerball to rollerball and achieves the benefits of ease of use and efficiency attributed to circular menus. Other configurations may also be used to arrange a group of selector controls without departing from the spirit of the present invention.

Figure 3:
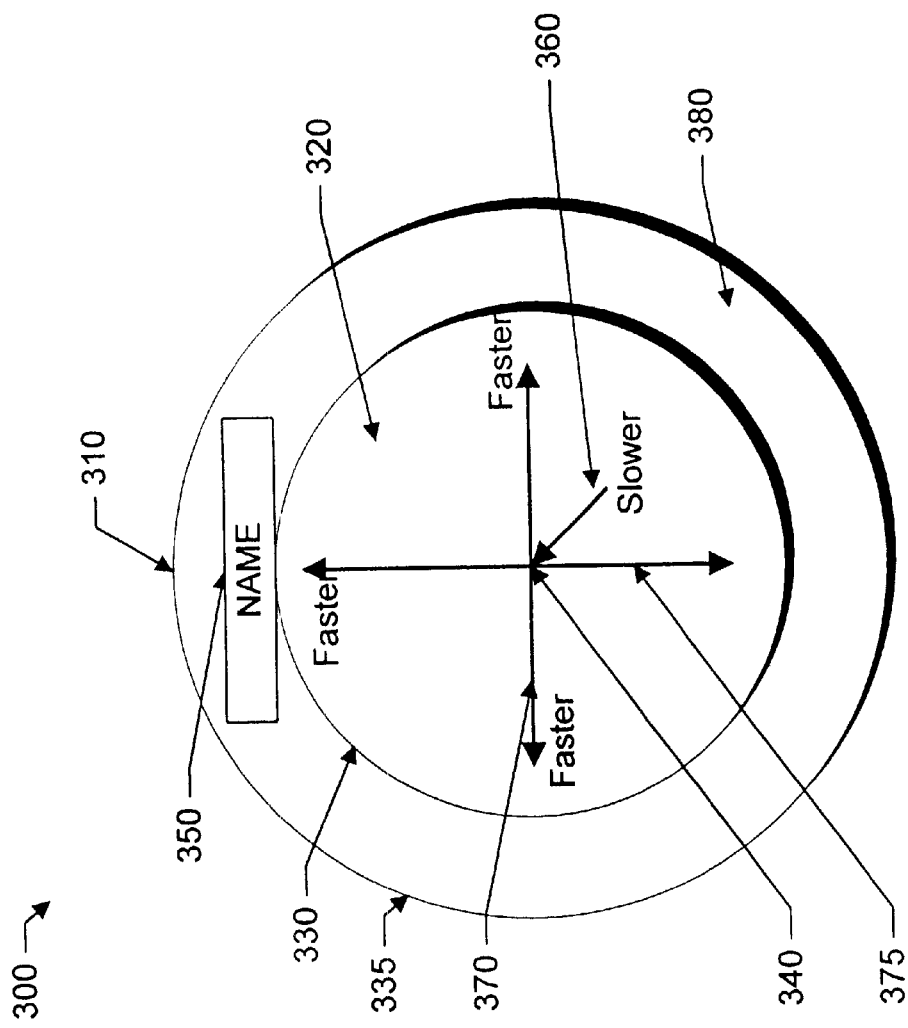
FIG. 3 is a conceptual diagram of the layout of a "rollerball" in accordance with the illustrative embodiment of the present invention.

Referring to FIG. 3, a selector control in the form of a rollerball is shown, which acts as an operator controllable device. Within a computer application, the rollerball may be used in a variety of ways, such as for controlling and selecting the property values of operator selected objects, performance of operations, or selecting menu items from a menu. The rollerball is made up of two primary regions and two bezels. The first region is an outer ring 310 which is substantially inactive in the illustrative embodiment, but could be made active to support operations relative to the selector controls, entities which are under control, or otherwise. The outer ring 310 does, however, display the name 350 of the object property, operation, or menu which the rollerball controls. The second region is the active inner region 320 which contains within it program logic to provide operator feedback and accept operator input. In the illustrative embodiment, the active region 320 provides operator feedback of the value of the object property, menu item, or operation which that control represents. For example, if the control represents the color property of a selected object, and the current color of the object was red, then the color, i.e. red, would fill the active region 320. If the control represented an edit menu, which had a default value of "save", then the active region might display the text "save". There are various ways to represent values or items relative to the control device. The value in the active region 320 changes as the operator moves the mouse cursor around the active region 320. In the illustrative embodiment, moving the cursor from the outer edge of the active region toward the center 340 causes the values to scroll within the display at a decreasing rate, as depicted by the scroll speed as arrow 360. Moving the cursor from the center 340 of the active region toward the outer ring either left, right or upward causes the property values to scroll at an increasing rate. In another embodiment, movement of the cursor beyond the boundaries of the inner or outer regions allows the scrolling to continue. In yet another embodiment, moving the cursor beyond the inner or outer regions causes the value to return to its previous setting or a default setting. This variability of scrolling speeds, controllable by the operator, allows the operator to increase efficiency as skill increases. In the illustrative embodiment, moving the cursor from the center 340 downward in accordance with arrow 375 causes the entire set of control devices to be rendered, whereas only a single device may have been previously rendered. Other variations in cursor movement relative to the rollerball and scroll rates may also be employed to achieve substantially similar results. In the illustrative embodiment, the two bezels 330, 335 are left inactive, but could easily be made active to support control of functions related to the control devices themselves or the entities, which they represent.

Figure 4:
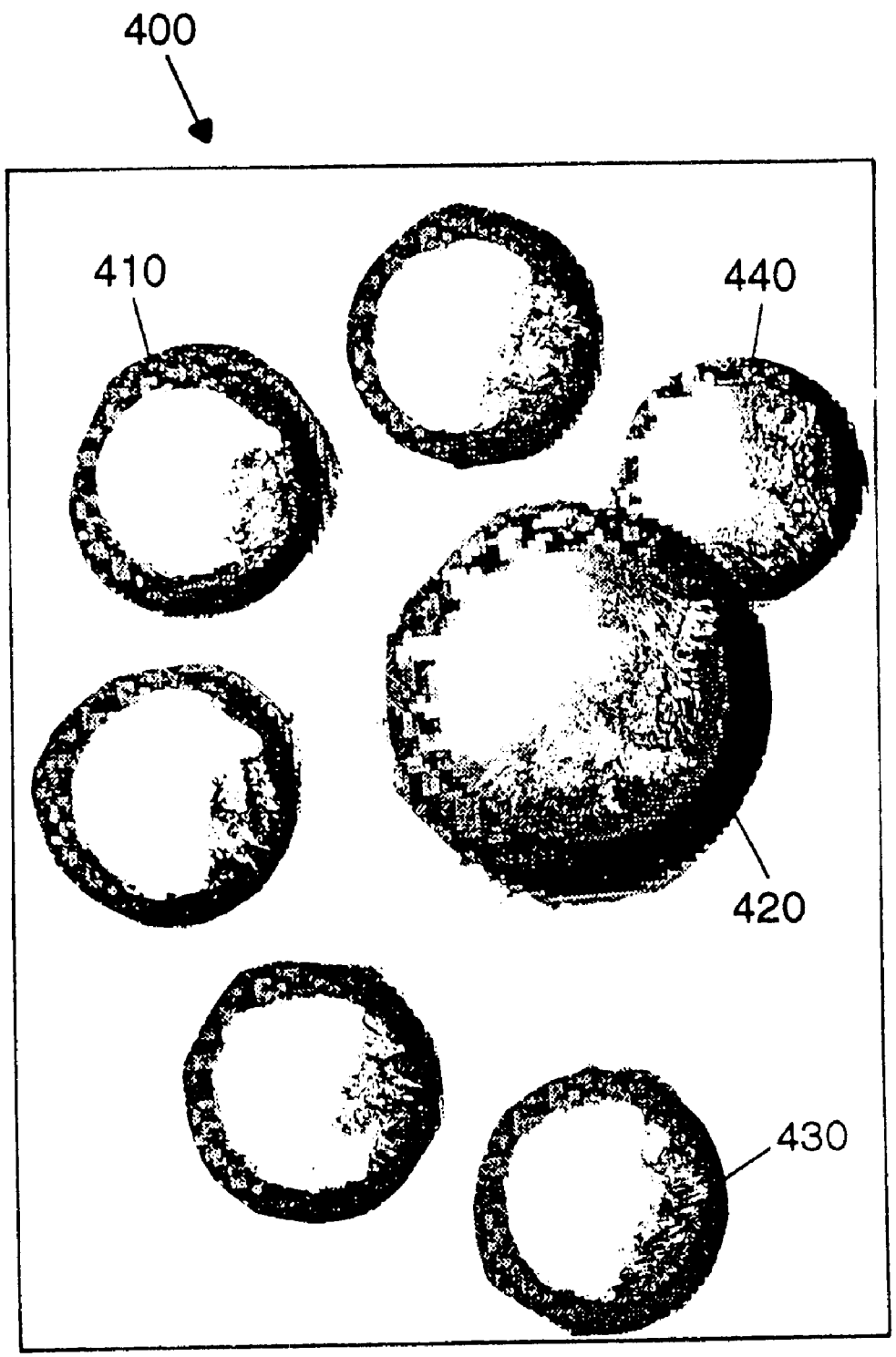
FIG. 4 is a conceptual diagram of the spiral layout of a set of rollerballs in accordance with the illustrative embodiment of the present invention.

FIG. 4, represents the illustrative configuration for a group of rollerballs, without rollerball names or values shown. Each rollerball 410 within the group 400 represents a different property, for example. Within this configuration, the rollerballs are arranged in a spiral which provides a similar speed advantage to that provided by circular menus. The rollerballs could also be ordered based on frequency of use such that the rollerball nearest the spiral center 420 relates to the object property, operation, or menu most frequently used. From the center rollerball 420, the remaining rollerballs would then be orientated in decreasing order of frequency of use until reaching the last rollerball 430, which is the least frequently used of the set. When a rollerball is selected, such as rollerball 420 in the center, it increases in size by forty percent over the "normal" rollerball size, which is represented by the remaining rollerballs. The selected rollerball 420 also increases in opacity to be one hundred percent opaque, or "full" opacity. The "normal" opacity of the rollerballs when not selected is forty percent of full opacity, in the illustrative embodiment. The rollerball nearest the selected rollerball 440 remains at the normal size, but increases in opacity to sixty percent, or "medium" opacity. When no rollerballs within the group are selected, all rollerballs are at forty percent opacity and normal size, which minimizes their visual impact on the active window. The selector control group can also be "hidden", so as not to obstruct the underlying image at all. Variations in the size, opacity, shape, or configuration of the individual selector controls or group of controls may also serve the objectives of the present invention and are intended to be within the scope and spirit of the present invention.

Figure 5:
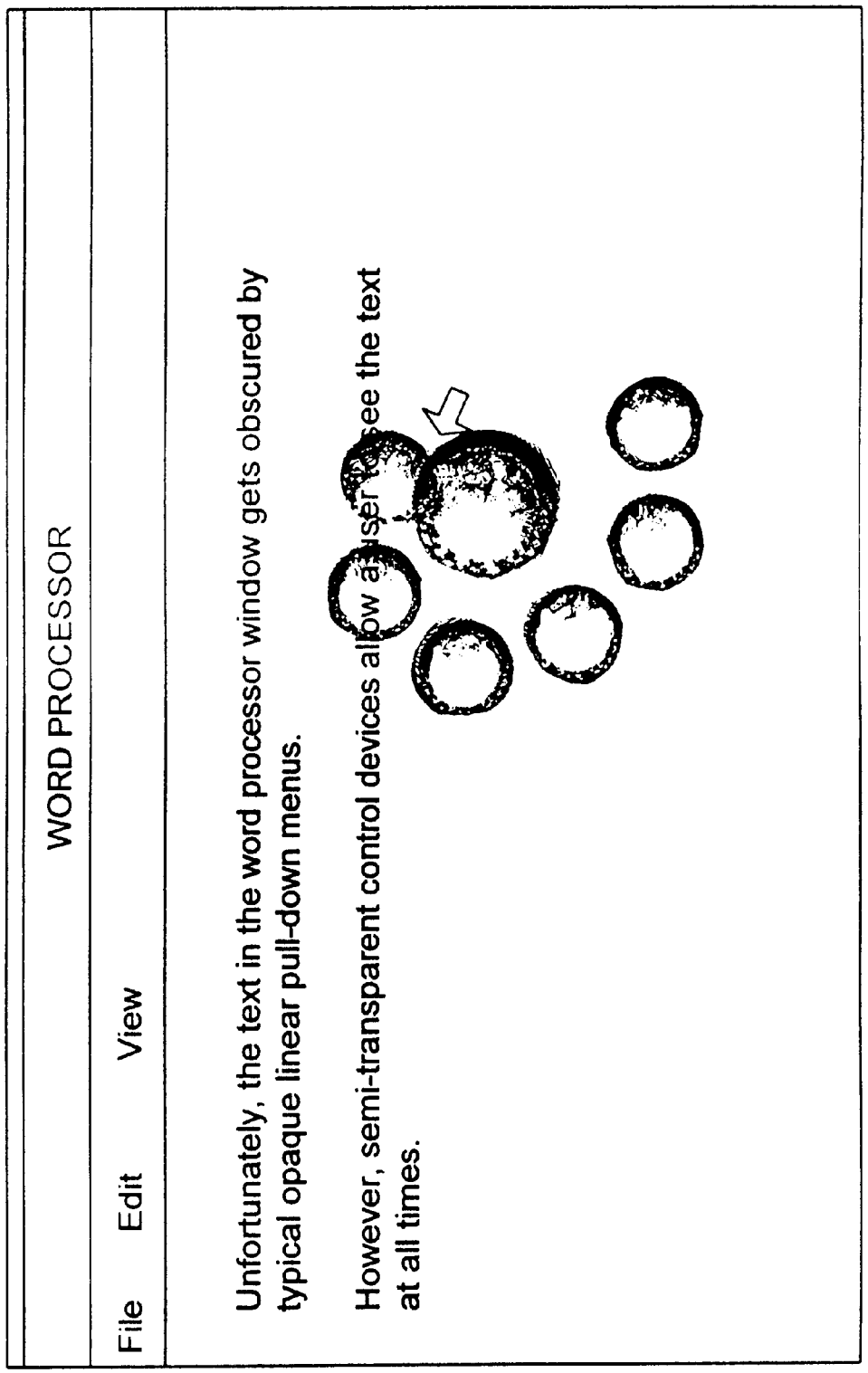
FIG. 5 is a conceptual diagram of the spiral configuration of rollerballs overlaying an active window in accordance with the illustrative embodiment of the present invention.

FIG. 5 shows a typical set of rollerballs 510 used with a word processing document and located within the active word processing window 500. The group of rollerballs 510 can be moved about the screen, similar to tear-off or pop-up menus. The center rollerball 530 has been "pre-selected" by placing the mouse cursor 540 over the rollerball 530. The pre-selection has caused the center rollerball 530 to increase in size by forty percent and increase its opacity to one hundred percent. Pre-selection of the center rollerball 530 has also caused the adjacent rollerball 520 to increase in opacity to sixty percent, but remain at normal size. In this example, a portion of the text has been selected and the object property, operation, or menu controlled by the operator with the rollerballs 510 would relate to that text. Actual "selection" of the rollerball occurs when the user manipulates the rollerball to choose or change a value or operation, which involves, in one embodiment, mouse clicking over the rollerball to make a selection or initiate an operation. In another embodiment, an operator could select an object to edit and "select" a rollerball by a combination of hot key and mouse click, e.g. hold control key and mouse click on entity to be controlled, and with mouse button depressed move the cursor to the desired rollerball and then about the active region 320 to commence scrolling and then release the mouse button to select a new value when the desired value is rendered.

Figure 6A:
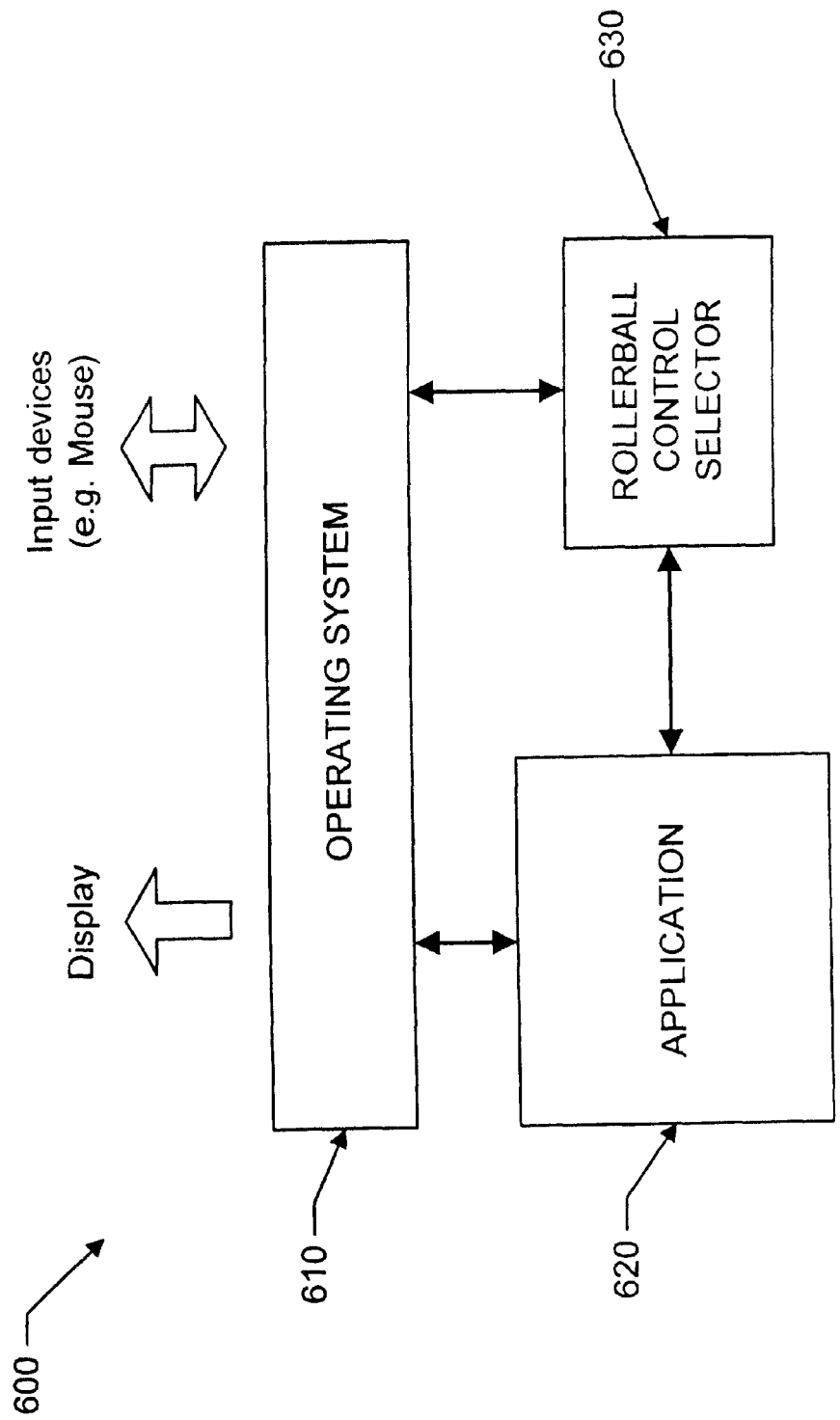
FIG. 6A is a conceptual block diagram of the illustrative embodiment of the present invention within the context of a desktop computer system.

Referring to FIG. 6A, the illustrative embodiment of the present invention is shown within the context of a desktop computer system 600. For the most part, the operating system 610 of the desktop computer controls the communications between a software application 620 and the rollerball software 630 of the illustrative embodiment. Typically, the operating system 610 provides basic services to the application 620, such as constructing windows and controlling display and input devices. For example, the operating system 610 will accept signals from the mouse and use those to drive the display of the mouse cursor. When a mouse selection is made, the operating system 610 will send messages to the application 620, where the application 620 interprets the messages and translates them into appropriate application activity. When the mouse is used to manipulate the selector control rollerballs, the operating system 610 controls communications among the mouse, display, rollerball software 630, and application 620 to ensure that the proper rollerball and application activity is undertaken in response to the user's activity. Various implementations may also involve a certain level of direct communication between the application software and control device apparatus itself.

Figure 6B:
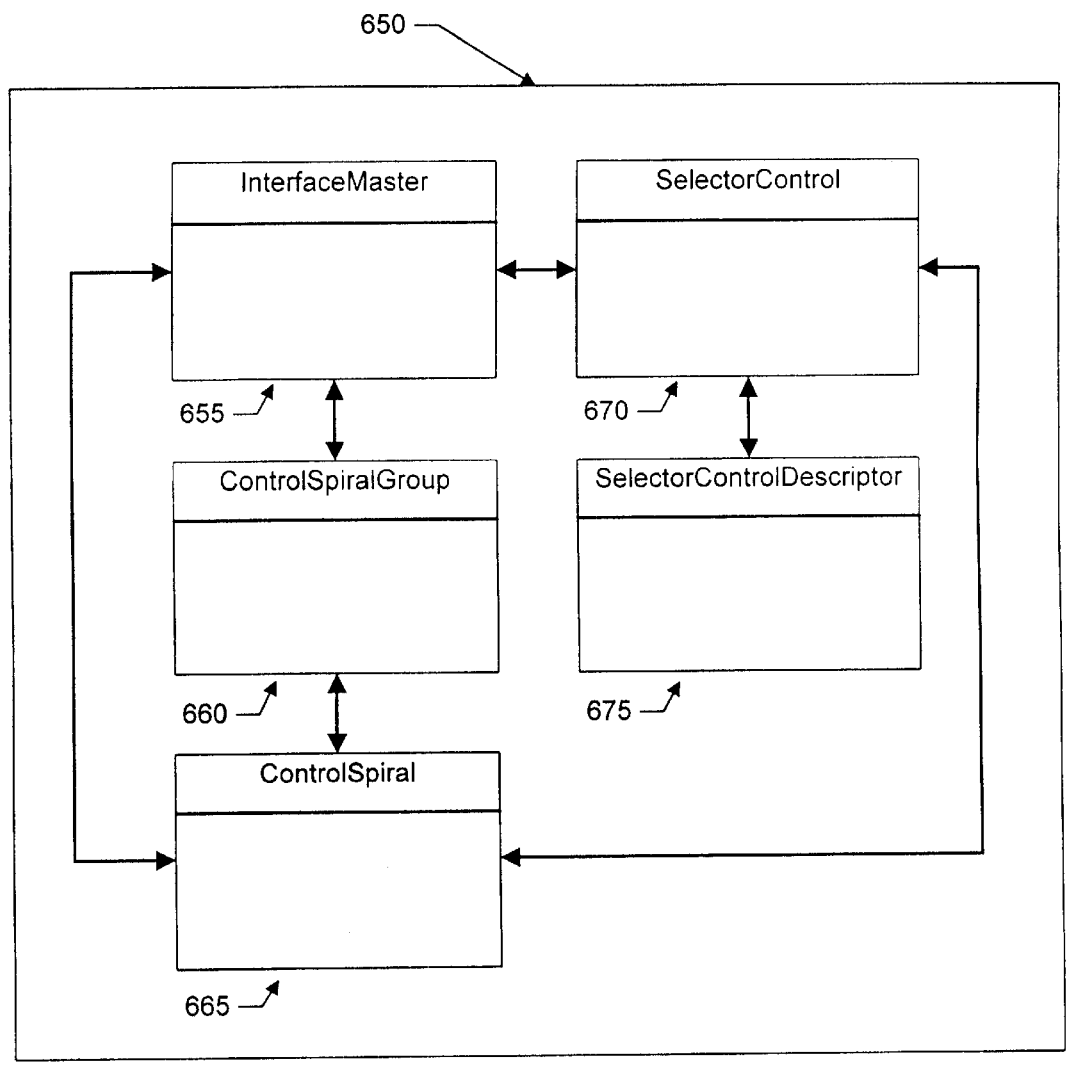
FIG. 6B is a conceptual block diagram of the key objects in accordance with the illustrative embodiment of the present invention.

Referring to FIG. 6B, the illustrative embodiment of the present invention is implemented in the Java programming language. Those skilled in the art will recognize that the present invention could be implemented in other programming languages as well. The present invention is comprised of the following key objects: InterfaceMaster object 655; ControlSpiralGroup object 660; ControlSpiral object 665; SelectorControl object 670 and SelectorControlDescriptor object 675. Each of these objects is described more fully below. FIG. 6B also depicts some of the basic inter-object communications, which are also described more fully below in the context of the object descriptions. While FIG. 6B represents one embodiment of the present invention, the actual object definitions and inter and intra-object communications may differ without departing from the spirit and scope of the present invention.

The InterfaceMaster (IM) object 655 contains properties and methods which relate generally to any selector control, i.e. rollerball, and serves as an interface to each selector control for establishing fundamental rollerball properties. The IM object 655 contains a RateOfSizeChange property, the value of which relates to how fast the selector controls, or rollerballs, change size. The IM object 655 also includes methods to set and get the rate of size change. The SetRateOfSizeChange method sets how fast the controls change size, whether increasing or decreasing, in response to the selector control being pre-selected or deselected. The GetRateOfSizeChange method returns the current value of the RateOfSizeChange property and is used by the GrowSelectorControl method, discussed below, where the value is used as a starting point when animating the control size changes. Similarly, the IM object 655 contains a PercentTransparencyChange property which holds the value of how much the transparency changes from one render frame to the next. This value is computed at startup by dividing the RateOfSizeChange property value by the value of the NumberOfControlGraphicFrames property. The SetPercentOfTransparencyChange method sets the rate, or degree, of transparency change for all controls. This rate of transparency change is computed at startup by dividing 100%, or full opacity, by the number of discrete graphics, i.e. frames, in a control resource. For example, if a control is animated using 10 separate bit maps, then the rate of transparency change will be 10% per cycle, i.e. 100% divided by 10. A method called GetDegreeOfTransparencyChange returns the degree, or rate, of transparency change for all controls, i.e. rollerballs. As mentioned, the degree in the previous example is 10%. Also, the IM object 655 contains properties for the maximum and current cycle speeds. The cycle speed relates to how fast the value changes during scrolling or cycling of the selector control. Therefore, the SelectorControlMaxCycleSpeed property holds the value of the fastest rate at which values can change within a selector control. Accordingly, the SetMaximumControlSpeed method sets the value of the SelectorControlMaxCycleSpeed property. And, the GetMaximumControlSpeed method returns the value of the SelectorControlMaxCycleSpeed property. The SelectorControlCurrentCycleSpeed property holds the value of the current rate at which property values are changing within a selector control, which is a function of the current distance of the mouse pointer from the center of the selector control. The IM object 655 also contains a property SelectorControlCycleSound, which identifies a sound to be played when a selector control displays a different property. A property which holds the value of a sound to be played when a control spiral is displayed, i.e. spiral of rollerballs, called SpiralObjectSound, is also included in the IM object 655.

The ControlSpiralGroup (CSG) object 660 is comprised of properties, which relate specifically to individual groups of selector control rollerballs. The SpiralGroupName property holds a value, which identifies a specific rollerball group and is used to reference such a specific group among several groups by the application or environment to which they pertain. The CSG object 660 also includes a property, which holds the value of an ordered linked list of control spirals within a specific control group, called SpiralControlObjectList. Wherein, each group could represent an individual object and each rollerball within the group would correlate to a specific property of that object. For example, in a word processing application, there may exist a text object, table object, graphic object, page set up object, and so on, with each object having its own selector control group of properties. The rollerball groups may also be implemented to represent menus associated with a given application, as an alternative to pull-down or other types of menus. For example, a rollerball within the group may represent the "Edit" menu in a word processing application. Scrolling through the rollerball would cause various menu items, e.g. cut, paste, and select, to be shown in the inner region 320.

The ControlSpiral (CS) object 665 contains a variety of properties and methods, which relate to a specific selector control rollerball group. For example, a group of rollerballs may relate to text as an object. The text object properties within the group may include a different rollerball for each of font type, size, color, style, and pitch. The CS object 665 contains a property, which holds the spiral name, called SpiralName, and the spiral curve definition. The SpiralCurveDefinition property holds a function, which describes the curve of the spiral, used to render or draw the spiral and locate controls on it. Th CS object 665 also contains a SpiralControlCount property which holds the value for the number of controls, that is rollerballs, within the group and a SpiralControlObjectList property which holds the values of an ordered list of those controls, where order is based on frequency of use. The SpiralScreenCoordinates property holds the screen coordinates of the inner point of the spiral. The center of the primary, or highest frequency, selector control is coincident with the inner point and the rest of the selector controls of the group are rendered relative to the location of primary control, based on the SpiralCurveDefinition property. Also, the SpiralCurrentSelectorControl property includes a pointer to the item in the SpiralControlObjectList property that is currently pre-selected or selected. A control is pre-selected when it is hovered over with the mouse cursor and, thereby made active. A control is selected when a user actually manipulates the control to change a value or select an operation therefrom. The SpiralVisibility property includes a binary flag which controls whether the control spiral is being displayed or hidden. The Hide method of the CS object 665 hides the rollerball group, which means that it sets the SpiralVisibility flag to "off" and refreshes the area covered by the spiral control group, so that the group becomes hidden and the previously underlying image is restored. Accordingly, the Show method sets the SpiralVisibility flag to "on" and calls the DrawControlSpiral method to render, or draw, the spiral group. In turn, the DrawControlSpiral method of the CS object 665 renders the control spiral at the position indicated by the SpiralScreenCoordinates property and iteratively calls the DrawSelectorControl method of the SelectorControl object 670 to render each control described in the spiral group. Also, this object 665 contains a RunHighlightSequence method, which iterates through the ControlSpiralList and calls the FlashSelectorControl method to sequentially "flash", or highlight, each enabled control, or rollerball, within the spiral group. The PlayControlSpiralSound method plays the sound indicated by the SpiralObjectSound property of the IM Object 655, upon display of the control spiral. A control can be added to, removed from, or moved within the SpiralControlObjectList, using the AddControl, RemoveControl, or MoveControl methods respectively. The FocusOnControl method brings the specified or pre-selected control to its activated state by calling the GrowSelectorControl method of the SelectorControl object 670 to act on the newly pre-selected activated control and calls the FocusOffControl method to remove emphasis from, or deselect, the previously activated control. To remove emphasis, or deselect, the FocusOffControl method calls the ShrinkSelectorControl method of the SelectorControl object 670. Pre-selection and deselection occur in response to whether or not the mouse cursor is over a selector control or whether a selection has been made.

The SelectorControl (SC) object 670 contains properties and methods related directly to a specific selector control, that is rollerball, within the group of selector controls. For example, the SelectorControlObject property holds the control name of a given selector control, i.e. rollerball. The SelectorControlCurrentTransparency property holds the current transparency percentage of a control and is used by the DrawSelectorControl method to determine what transparency to apply. The corresponding SetControlTransparency method increments the SelectorControlCurrentTransparency value up or down by an amount in accordance with the value of the PercentTransparencyChange property of the IM object 655. The number of properties, operations, or menu items governed by a particular control are stored in the SelectorControlPropertyValueCount property. Also, the SelectorControlPropertyValueList property holds an ordered linked list of the values associated with a property, operation, or menu item governed by a control. The SelectorControlCurrentProperty holds a pointer to the setting in the SelectorControlPropertyValueList which is current. The ShowNextProperty and ShowPreviousProperty methods get the next and previous property, respectively, from the SpiralControlObjectList of the CS object 665 and call the DrawSelectorControl method to render the next or previous property change. The ShowPropertyList method renders a pop-up list according to the description in the SelectorControlPropertyListDisplay property of the SelectorControlDescriptor object 675, discussed below. The pop-up list allows a user to see all the values for the property, from the SelectorControlPropertyValueList and select one directly without cycling.

The SC Object 670 also contains properties and methods related to the visual display of selector controls. The SelectorControlVisibility property holds a value, which indicates whether a selector control is being displayed. And, the SelectorControlEnablement property indicates, through the setting of a binary flag, whether the selector control is enabled. Accordingly, the EnableSelectorControl method sets the SelectorControlEnablement value to "true" and the DisableSelectorControl method sets the SelectorControlEnablement value to "false". The SelectorControlCurrentFrame property holds the current graphic number, used to reference the proper graphic, or frame, for the control bezel. For example, if there were 10 graphic frames associated with different states of a control, the "current graphic number" might be "3" to indicate that the third of the 10 graphic frames is being displayed currently. The DrawSelectorControl method renders a selector control, the bezel and current property setting, at the size and transparency settings of SelectorControlCurrentTransparency, SelectorControlCurrentProperty, SelectorControlCurrentFrame, and SelectorControlEnablement properties. The present implementation is optimized to draw only areas that change, so that scrolling through values does not cause the entire control bezel to be redrawn each time a new value appears during scrolling. The FlashSelectorControl method renders a control in a special emphasized way and then calls the DrawSelectorControl method to render it normally to create a "flashing" affect. The FlashSelectorControl method only affects a control that is enabled, or active. For example, if a currently selected object has color and is not locked and the control in question sets color, then the control is enabled. If the control does not have color or is locked then the control is disabled and skipped by the FlashSelectorControl method. The GrowSelectorControl method sequentially draws the several graphic frames of a control until the correct level is reached and calls the SetControlTransparency method at each frame. Therefore, if a control is selected, the GrowControlMethod draws the control to full size and opacity. Alternatively, the ShrinkSelectorControl method performs the inverse function of the GrowSelectorControl method, returning the control to the appropriate size. Also, a pointer to the SelectorControlDescriptor property of the SelectorControlDescriptor object 675 is included in the SelectorControl object 670, wherein the SelectorControlDescriptor object 675 describes how the control's bezel is to be drawn.

The SelectorControl object 670 also contains methods, which relate to the cycling or scrolling through values associated with mouse cursor movement. The SetCurrentCycleSpeed method is called in response to changes in movement of the mouse cursor relative to the center of a control, wherein the value is stored in the SelectorControl-CurrentCycleSpeed property of the InterfaceMaster object 655. Also, a method, called PlayControlCycleSound, retrieves the sound value stored in the SelectorControl-CycleSound property of the IM object 655 and plays it as each new property value is displayed, e.g. where a control represents an object property. The MouseIsOverControl method is called during mouse movement and returns a value of "true" when the mouse is over a control and a value of "false" otherwise. The result of this method governs size and transparency changes in the rendering methods. Finally, the MouseDistanceFromControlCenter method is called during mouse cursor movement to determine and return the distance of the mouse cursor from the center of the control, thereby allowing the scroll speed to be varied, that is faster as the mouse moves towards the outer edge and slower as the mouse moves toward the center. The result governs the speed of property value changes in the rendering methods.

The SelectorControlDescriptor object 675 provides information about the graphical properties needed to render, or display, a particular selector control. Selector controls are described herein as being rendered as a series of bitmap frames, like animation, but there are other possible ways to render the selector controls and sequences. The SelectorControlDescriptorName property stores the name of a selector control descriptor, which describes the needed graphical properties to render that selector control. The SelectorControlFrameArray property is an array of n frames representing the control at different sizes. The last two frames are the same, i.e. maximum, size in the illustrative embodiment. However, the last frame shows extra detail indicating that the control is fully activated. The SelectorControlFrameCount property represents the number of frames in a control animation. The SelectorControlPropertyListDisplay property contains information, which describes how the shortcut pop-up list showing all values of the control is to be rendered, e.g. tables, wheels, lists.

Figure 7:
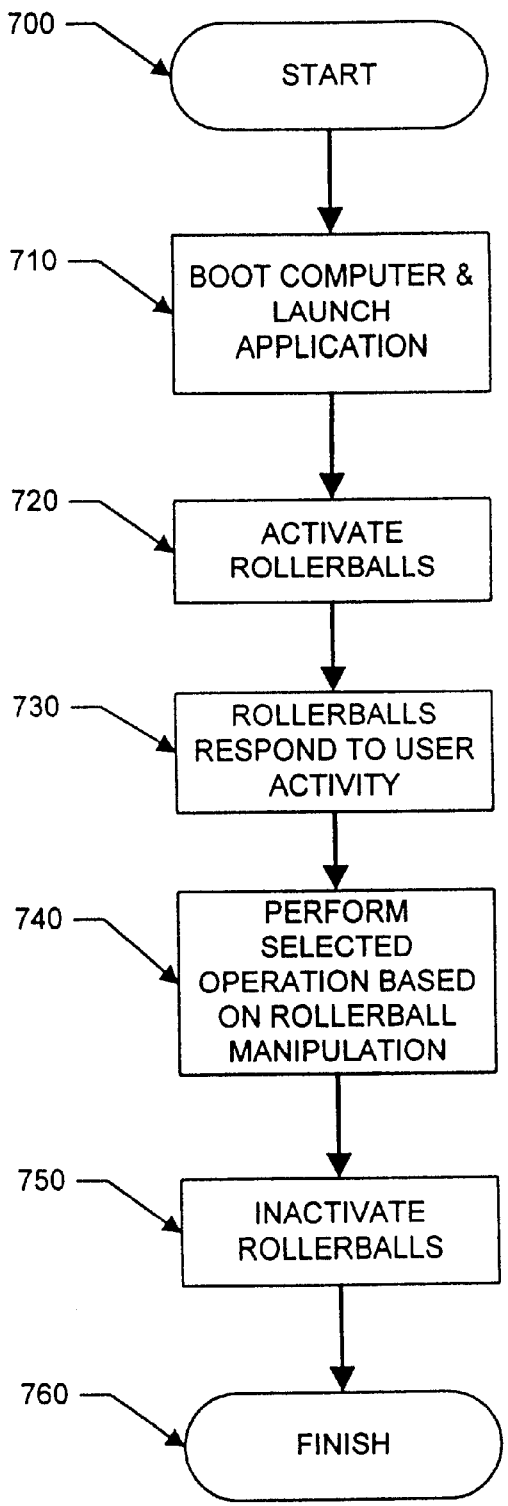
FIG. 7 is a flowchart illustrating the process steps for providing an improved graphical user interface in accordance with the illustrative embodiment of the present invention.

Referring to FIG. 7, a method for providing an improved graphical user interface for a desktop computer is described. As discussed above, the improvements entail a less cluttered screen as well as increased ease of use, speed, and accuracy by the user. The process begins in step 700 where it is assumed that a desktop computer is available to a user, which implements the present invention. In step 710, the user boots the computer and launches an application, such as a word processor. The user will either choose to operate on an existing document, which he or she may then open or the user will create a new document. With a document opened, the user activates the selector control devices i.e. rollerballs, in step 720. The rollerballs could also be made to activate automatically upon opening of the application. Also the rollerballs could be made to activate upon selection of an entity within the document. For example, if the user selects a text segment, rollerballs relating to text properties and related functions may automatically be rendered. In yet another embodiment, only a first rollerball of a group of rollerballs is initially rendered, with the remaining rollerballs of the group being rendered in response to the user's mouse activity, for example. As part of step 720, the computer will display the rollerballs such that the rollerballs are semi-transparent and, thereby, mitigate obstruction of the underlying window or document. Depending on how many rollerballs are related to a selected entity, either one or a group of rollerballs may be rendered. In step 730 of the illustrative embodiment, the user selects an entity, e.g. a text segment, by holding down the control key and clicking down on the mouse key over the entity. Next, with the mouse key still depressed, the user moves the cursor over the rollerball of interest and the rollerball gives the user feedback as to what object property value, operation or menu item, i.e. rollerball value, is about to be selected. In the illustrative embodiment, this is referred to as pre-selecting. The rollerball automatically gives feedback to the user indicating its pre-selection, including displaying the relevant name and current value associated with the rollerball and allowing scrolling through values in response to the cursor manipulation. The term "value" may be applied to an object's property value, a specific operation, or a menu item. Moving the cursor about the rollerball, with the mouse button still depressed, causes the scrolling of values. Releasing the mouse button causes the currently displayed value to be selected. In step 740, with the user selecting either an object property, operation, or menu item value, the computer will perform the operation or change the property value according to the user's selection. In step 750, the rollerballs, not in use any longer, will have their visual presence minimized, so as to reduce their obstruction to the underlying document. In this step, the user may also close the rollerballs altogether, so that they are not visible at all. In another embodiment the rollerballs could automatically minimize upon completion of the selection operation. In step 760, the process is complete.

Figure 8:
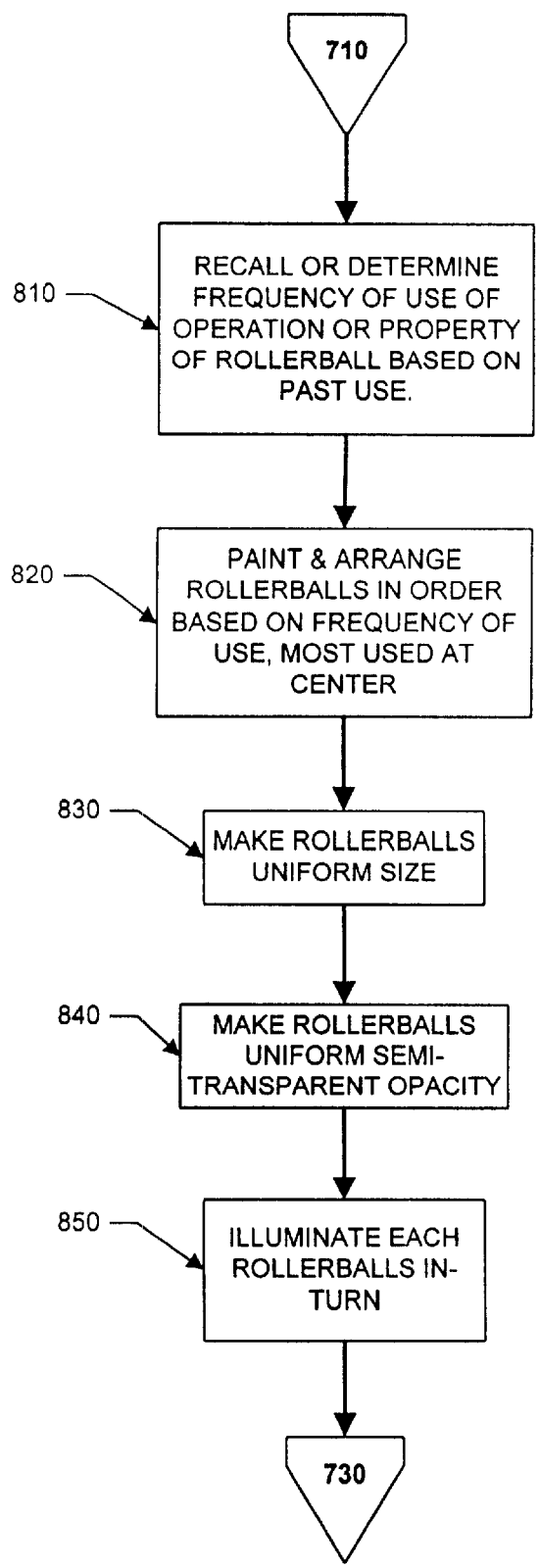
FIG. 8 is a flowchart illustrating the process for activation of the rollerballs of the present invention.

In another embodiment of the illustrative invention, the arrangement of control devices within a group of devices is dynamically or periodically reordered based on frequency of use of the devices within the group. This process is embodied in the method of FIG. 8, which expands on the operations of step 720 in FIG. 7. Therefore, the starting point assumes completion of step 710 of FIG. 7. In step 810, the system, e.g. computer, rollerball software, application or some combination thereof, recalls or determines the frequency of use of each rollerball of the selected set of rollerballs. In step 820, the computer "paints" the rollerballs on the screen in an ordered configuration, arranging them based on their frequency of use such that the most used rollerball is at one end and the least used rollerball is at the distal end of the rollerball configuration. In the illustrative embodiment the rollerball configuration takes the form of a spiral, with the most used rollerball at the center. To "paint" the rollerballs means to make them visible or render them on the screen to the user by illuminating certain screen pixels. As the rollerballs are being painted, the rollerballs are made a uniform size, in step 830. In step 840, the rollerballs are also painted with a uniform semi-transparent opacity, so that they are visible to the user but not opaque. This approach leaves the underlying document as the predominant visual image to the user. In step 850, each rollerball is illuminated briefly in turn to indicate to the user that the rollerballs are active and useable by the user. The process then proceeds to step 730 of FIG. 7.

Figure 9:
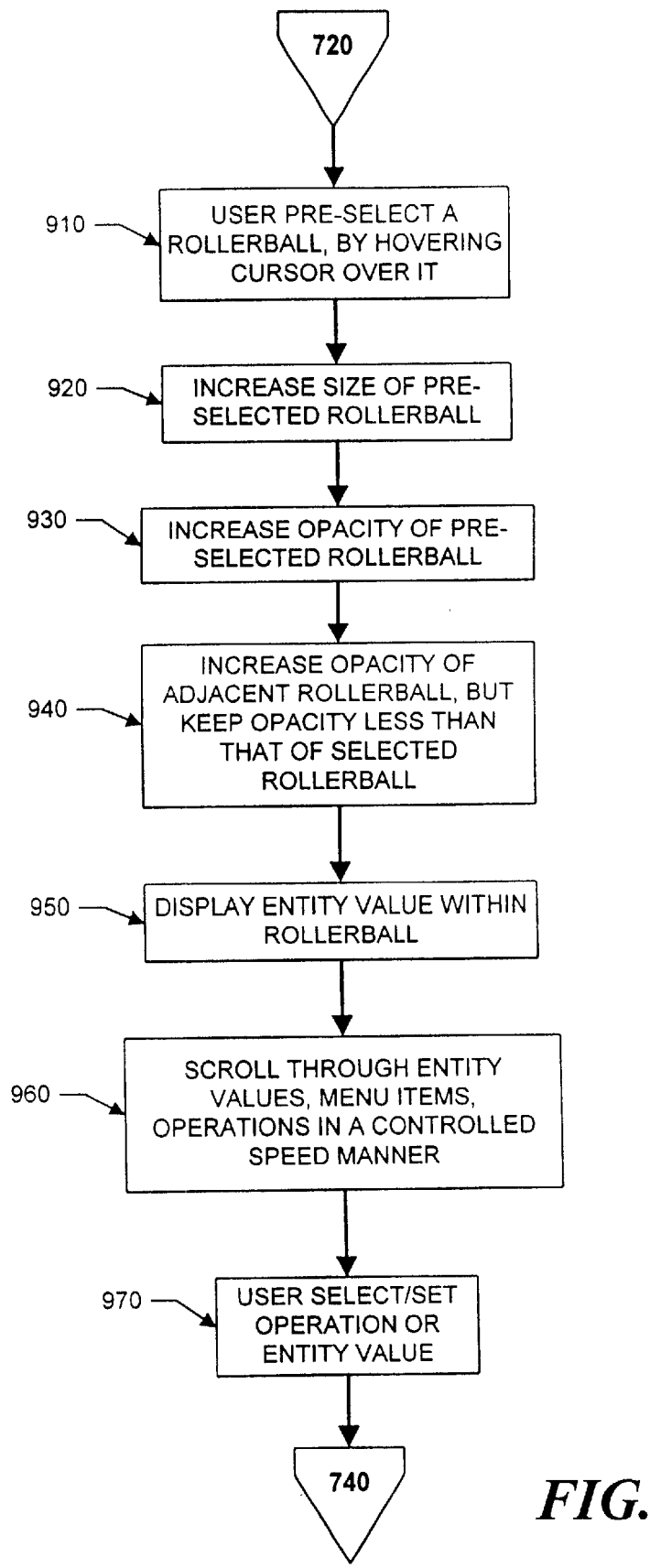
FIG. 9 is a flowchart illustrating the process for selecting operations and modifying properties in accordance with the present invention.

FIG. 9 begins with step 720 of FIG. 7 having been completed and expands on step 730 of FIG. 7. In step 910, the user pre-selects a rollerball from the spiral configuration by placing the cursor, or hovering, over the desired rollerball, for example. The computer in combination with the present invention, in step 920, determines that the cursor remains over the rollerball and automatically increases the size of the pre-selected rollerball. In step 930, the computer also increases the opacity of the pre-selected rollerball. In the illustrative embodiment, the size of the pre-selected rollerball is increased by forty percent over the size of the other rollerballs. Also in the illustrative embodiment, the opacity of the selected rollerball is increased from the "normal" or low level, i.e. forty percent, opacity to a full one hundred percent opacity. In step 940, the opacity of the rollerballs adjacent to the selected rollerball is increased to a "medium" level, which is between "normal" and full opacity, but their sizes remain unchanged. In the illustrative embodiment, the medium opacity is sixty percent. In step 950, the value of the object property, operation, or menu item associated with the pre-selected rollerball is displayed within the rollerball. In step 960, movement of the cursor within the rollerball causes and controls the rate of scrolling of the rollerball values. In the illustrative embodiment, moving the cursor from the center of the rollerball out radially increases the rate with which the values are scrolled. In the illustrative embodiment, the rate with which the values are scrolled may be changed in a non-linear manner, for example, to emulate the rate of acceleration of an object along the surface of a sphere, thereby giving the rollerball control a more life-like feel. Moving the cursor from the outside radially in toward the center causes the scrolling speed to decrease. The rate at which the scrolling speed decreases as the cursor moves towards the center of the rollerball may likewise be nonlinear in relation to the position of the cursor in a manner which is converse to the rate at which the scrolling speed accelerates.

Alternatively, moving the cursor from the outside of the rollerball radially in toward the center may cause the scrolling speed to increase while moving the cursor from the center of the rollerball out radially may decrease the rate with which the values are scrolled. In this manner the scroll rates associated with progressive selection of selected portions of the active region of the rollerbal are reversed in comparison to the example illustrated in FIG. 4, as may be left to the designer's discretion. In addition, the invention may be implemented so that moving the cursor along a predefined path, such as vertically downward from the center of the rollerball, may cause the entire group of rollerballs to be rendered, if not already rendered.

Once the user has scrolled to the desired value, in step 970, the user selects that value with the cursor by, for example, a mouse click or release of a depressed mouse button. The process then proceeds to step 740 of FIG. 7.

Figure 10:
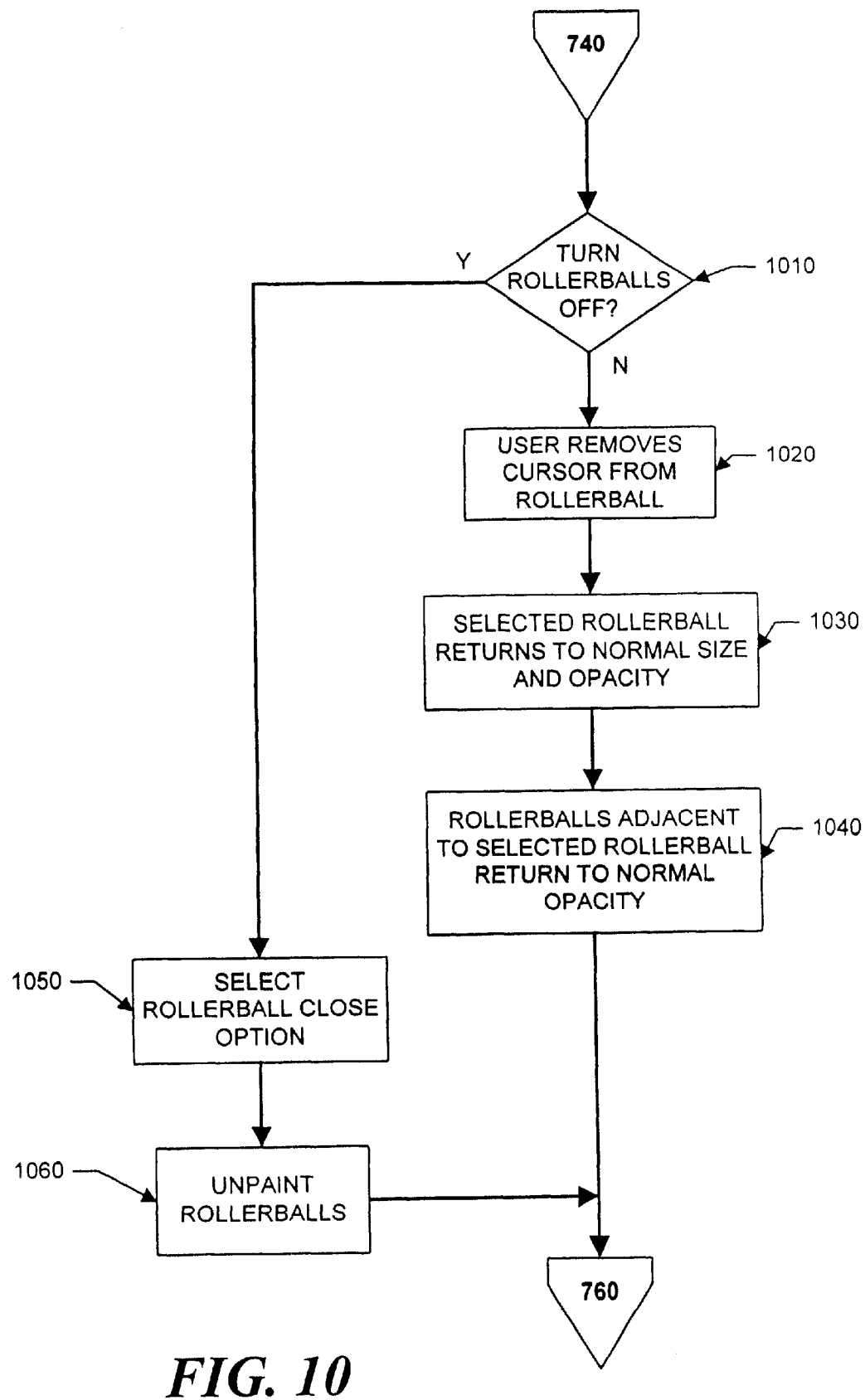
FIG. 10 is a flowchart illustrating the process for inactivating the rollerballs in accordance with the present invention.

FIG. 10 expands on the steps of process step 750 of FIG. 7. There are two ways to terminate usage of the rollerballs. The first way is to turn the rollerballs off completely and the other is not to turn them off but to put them in what is considered an "inactive" mode, where they are still available to the user and visible although semi-transparent. In step 1010, the decision of whether to turn the rollerballs off completely or put them in inactive mode is made. If the decision is to turn the rollerballs off, the process proceeds to step 1050 where the user performs an activity to close the rollerball. Such an activity, may be implemented in a number of ways, for example, through the use of a hot key or by choosing a menu option or item which closes the rollerballs. When such a selection is made, the process proceeds to step 1060 and the rollerballs are "unpainted" by the computer, which means that they are no longer visible to or actively available for the user. At that point, the process proceeds to step 760 of FIG. 7, which is completion. If the rollerballs are not to be turned off, but instead remain in the inactive mode and available to the user, then the process follows the "no" path from step 1010. In step 1020, the user removes the cursor from the rollerball. Therefore, the cursor is not hovering over any of the rollerballs in the spiral. The rollerball that was once selected returns to its normal size and opacity in step 1030. The rollerballs adjacent to the once selected rollerball return to their normal opacity in step 1040. At that point, the process is finished and proceeds to step 760.

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Furthermore, the methods of the invention may be achieved in other software implementations, using the appropriate processor instructions, or in hybrid implementations, which utilize a combination of hardware logic and software logic to achieve the same results. Such modifications to the inventive concept are intended to be covered by the appended claims.

What is claimed is:

1. A computer program product for use with a computer system having a display apparatus, a graphic user interface and an input device, the computer program product comprising:

a computer usable medium having computer readable program code thereon for creating a control device to enable selection and control of a data entity, the control device having at least one operational state and a plurality of visual characteristics, including the opacity of the control device, the computer program code comprising:

program code for maintaining the operational state of the control device;

program code, responsive to the program code for maintaining the operational state, for generating a graphic display of the control device;

program code for defining an active region of said graphic display and responsive to selection of a portion of the active region;

program code for displaying a value associated with a data entity to which the control device relates;

program code, responsive to the program code for defining the active region and the program code for displaying a value associated with the data entity, for selectively scrolling through displayed values of the data entity at a rate which varies in response to the portion of the active region selected; and program code, responsive to the operational state of the control device, for selectively changing the opacity of the control device in relation to changes in the operational state of the control device.

2. The computer program product of claim 1 wherein the control device has an inactive operational state and wherein the program code for modifying the opacity of the control device further comprises:

program code for reducing the opacity of the control when the control device is in an inactive operational state.

3. The computer program product of claim 1 wherein the control device has an active operational state and wherein the program code for modifying the opacity of the control device further comprises:

program code for increasing the opacity of the control device when the control device is in an active operational state.

4. The computer program product of claim 1 wherein one of the visual characteristics of the control device is the size of the control device and wherein the program code for generating a graphical display of the control device comprises:

program code, responsive to an operational state of the control device, for modifying the size of the control device in response to changes in the operational state of the control device.

5. The computer program product of claim 4 wherein the control device has an inactive operational state and wherein the program code for modifying the size of the control device further comprises:

program code for reducing the size of the control device when the control device is in an inactive operational state.

6. The computer program product of claim 4 wherein the control device has an active operational state and wherein the program code for modifying the size of the control device further comprises:

program code for increasing the size of the control device when the control device is in an active operational state.

7. The computer program product of claim 1, further comprising:

program code for creating a group of control devices, selected of the control devices each representing a different data entity; and program code for arranging the group of control devices based on a predetermined criteria.

8. A computer program product of claim 7 wherein the program code for ordering the group of control devices based on a predetermined criteria comprises:

program code for arranging the group of control devices in an ordered configuration based on frequency of user-selection.

9. The computer product program of claim 7, wherein the program code for creating a group of control devices comprises:

a program code for allowing movement of the group of control devices as a collective entity about the graphic user interface.

10. The computer product program of claim 7, wherein the program code for ordering the group of control devices further comprises:

a program code for arranging the group of control devices in a spiral configuration.

11. The computer product program of claim 10, wherein the program code for arranging the group of control devices further comprises:

program code for positioning a most frequently used control device of the group at the center of the spiral configuration and for positioning a least frequently used control device of the group at the distal end of the spiral configuration.

12. In a computer system having a display device with a graphical user interface and an input device, a graphical control device for selecting and controlling user selectable parameters, the control device having one or more operational states and visual characteristics, including the opacity of the control device, comprising:

program logic for displaying the control device;

program logic for displaying a value related to the parameter associated with the control device;

program logic for defining an active region of the control device and for enabling selection of a portion of the active region, each portion of the active region having associated therewith a scrolling rate; and program logic for modifying the opacity of the control device in response to changes in the operational state of the control device.

13. The apparatus of claim 12, wherein the control device has an active operational state and the program logic for modifying the opacity of the control device comprises:

program logic for increasing the opacity of the control device when the control device is in an active operational state.

14. The apparatus of claim 12, wherein the control device has an inactive operational state and the program logic for modifying the opacity of the control device comprises:

program logic for decreasing the opacity of the control device when the control device is in an inactive operational state.

15. The apparatus of claim 12, wherein the program logic for modifying the visual characteristics of the control device comprises:

program logic for modifying the size of the control device in response to changes in the operational state of the control device.

16. The apparatus of claim 12, wherein the control device has an active operational state and the program logic for modifying the size of the control device comprises:

program logic for increasing the size of the control device when the control device is in an active operational state.

17. The apparatus of claim 12, wherein the control device has an inactive operational state and the program logic for modifying the size of the control device comprises:

program logic for decreasing the size of the control device when the frequency of user selection.

18. The apparatus of claim 12, further comprising:

program logic, responsive to the portion of the active region selected, for selectively scrolling through displayed predefined values of the associated parameter at a rate associated with the portion of the active region selected.

19. The apparatus of claim 18 wherein the active region is characterized by a peripheral border surrounding a central interior region and wherein the program logic for selectively scrolling displays values of the associated parameter at a rate which is slower when the selected portion of the active region is in the central interior region than the rate when the selected portion of the active region is proximate the peripheral border.

20. The apparatus of claim 18 wherein the active region is characterized by a peripheral border surrounding a central interior region and wherein the program logic for scrolling displays values of the associated parameter at a rate which is faster when the selected portion of the active region is in the central interior region than the rate when the selected portion of the active region is proximate the peripheral border.

21. The apparatus of claim 12, further comprising:
a program logic for creating and displaying a plurality of graphical control devices, selected of each of the control device being associated with a different user selectable parameter.

22. The apparatus of claim 21, further comprising:
a program logic for displaying the plurality of control devices in an ordered configuration based on frequency of user-selection.

23. In a computer system having a display device with a graphical user interface and an input device, a method for selecting and controlling user selectable parameters with a graphic control device having one or more operational states and visual characteristics, including the opacity of the control device, the method comprising:
generating and displaying a control device;
displaying a value related to the parameter associated with the control device;
defining an active region of the control device and enabling selection of a portion of the active region, each portion of the active region having associated therewith a scrolling rate; and
modifying the opacity of the control device in response to changes in the operational state of the control device.

24. The method of claim 23, wherein the control device has an active operational state and the step of modifying the opacity of the control device comprises:
increasing the opacity of the control device when the control device is in an active operational state.

25. The method of claim 3, wherein the control device has an inactive operational state and the step of modifying the opacity of the control device comprises:
decreasing the opacity of the control device when the control device is in an inactive operational state.

26. The method of claim 23, wherein the step of modifying the visual characteristics of the control device comprises:
modifying the size of the control device in response to changes in the operational state of the control device.

27. The method of claim 23, wherein the control device has an active operational state and the step of modifying the size of the control device comprises:
increasing the size of the control device when the control device is in an active operational state.

28. The apparatus of claim 23, wherein the control device has an inactive operational state and the step of modifying the size of the control device comprises:
decreasing the size of the control device when the frequency of user selection.

29. The method of claim 23 further comprising:
selectively scrolling through displayed predefined values of the associated parameter at a rate associated with the portion of the active region selected, in responsive to selection of a portion of the active region.

30. The method of claim 29 wherein the active region is characterized by a peripheral border surrounding a central interior region and wherein the step of selectively scrolling displays values of the associated parameter at a rate which is slower when the selected portion of the active region is in the central interior region than the rate when the selected portion of the active region is proximate the peripheral border.

31. The method of claim 29 wherein the active region is characterized by a peripheral border surrounding a central interior region and wherein the step of scrolling displays values of the associated parameter at a rate which is faster when the selected portion of the active region is in the central interior region than the rate when the selected portion of the active region is proximate the peripheral border.

32. The method of claim 23, further comprising:
creating and displaying a plurality of graphical control devices, selected of each of the control device being associated with a different user selectable parameter.

33. The apparatus of claim 23, further comprising:
displaying the plurality of control devices in an ordered configuration based on frequency of user-selection.

* * * * *